US009019523B2

(12) United States Patent
Itogawa

(10) Patent No.: US 9,019,523 B2
(45) Date of Patent: Apr. 28, 2015

(54) PRINTING SYSTEM, PRINTING DEVICE AND COMPUTER READABLE MEDIUM THEREFOR

(75) Inventor: Yoshihiro Itogawa, Gifu (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 216 days.

(21) Appl. No.: 13/433,936

(22) Filed: Mar. 29, 2012

(65) Prior Publication Data

US 2012/0274974 A1 Nov. 1, 2012

(30) Foreign Application Priority Data

Apr. 28, 2011 (JP) ................................. 2011-101879

(51) Int. Cl.
*G06K 15/02* (2006.01)
*G06F 3/12* (2006.01)
*G06F 21/88* (2013.01)
(Continued)

(52) U.S. Cl.
CPC ............... *G06F 3/128* (2013.01); *G06F 3/122* (2013.01); *G06F 3/1222* (2013.01); *G06F 3/1267* (2013.01); *G06F 3/1274* (2013.01); *G06F 3/1285* (2013.01); *G06F 21/88* (2013.01); *G06K 15/4005* (2013.01); *H04N 1/00244* (2013.01); *H04N 1/2158* (2013.01); *H04N 2201/0039* (2013.01); *H04N 2201/0041* (2013.01); *H04N 2201/0049* (2013.01); *H04N 2201/218* (2013.01); *H04N 2201/0087* (2013.01);
(Continued)

(58) Field of Classification Search
None
See application file for complete search history.

(56) References Cited

U.S. PATENT DOCUMENTS 6,602,469 B1 * 8/2003 Maus et al. .................. 422/68.1
7,830,540 B2 11/2010 Matsuda
(Continued)

FOREIGN PATENT DOCUMENTS

JP 2000-267825 9/2000
JP 2004-215135 A 7/2004
(Continued)

OTHER PUBLICATIONS

Notification of Reasons for Rejection dated Feb. 12, 2013 received from the Japanese Patent Office from related Japanese Application No. 2010-293939 and U.S. Appl. No. 13/338,741, together with an English-language translation.
(Continued)

*Primary Examiner* — Ashish K Thomas
(74) *Attorney, Agent, or Firm* — Scully, Scott, Murphy & Presser, PC

(57) ABSTRACT

A printing system comprising a printing device and a server configured to perform data communication with the printing device. The printing device comprises a printing unit configured to print an image on a printing sheet, an attachment unit to which a removable medium is removably attached, a first communication interface configured to communicate with the server, and a first controller configured to acquire at least part of data in the removable medium attached to the attachment unit, control the first communication interface to transmit the acquired data to the server, delete the data in the removable medium corresponding to the acquired data. The server comprises a second communication interface configured to communicate with the printing device, a server-side storage configured to store the acquired data, and a second controller configured to store the acquired data received by the second communication interface in the server-side storage.

25 Claims, 4 Drawing Sheets

(51) Int. Cl.
*G06K 15/00* (2006.01)
*H04N 1/00* (2006.01)
*H04N 1/21* (2006.01)

(52) U.S. Cl.
CPC  *H04N2201/0082* (2013.01); *H04N 2201/0051* (2013.01)

(56) References Cited

U.S. PATENT DOCUMENTS

| | | | |
|---|---|---|---|
| 8,194,274 B2 * | 6/2012 | Babbrah et al. | 358/1.15 |
| 8,553,266 B2 * | 10/2013 | Chiba et al. | 358/1.15 |
| 2005/0160068 A1 * | 7/2005 | Sakaguchi | 707/1 |
| 2006/0119872 A1 * | 6/2006 | Koizumi | 358/1.13 |
| 2006/0172730 A1 | 8/2006 | Matsuda | |
| 2007/0263247 A1 * | 11/2007 | Nagai | 358/1.15 |
| 2010/0214589 A1 | 8/2010 | Fukano et al. | |

FOREIGN PATENT DOCUMENTS

| | | |
|---|---|---|
| JP | 2005-193411 A | 7/2005 |
| JP | 2006-25166 A | 1/2006 |
| JP | 2006-211560 | 8/2006 |
| JP | 2006-341497 A | 12/2006 |
| JP | 2006-343840 | 12/2006 |
| JP | 2007-34493 | 2/2007 |
| JP | 2007-210174 A | 8/2007 |
| JP | 2009-3658 A | 1/2009 |
| JP | 2009-78503 | 4/2009 |
| JP | 2009-187291 | 8/2009 |
| JP | 2009-237842 | 10/2009 |
| JP | 2009-284286 A | 12/2009 |
| JP | 2011-43881 A | 3/2011 |

OTHER PUBLICATIONS

Japanese Office Action dated Dec. 24, 2014 from related Japanese Application No. 2011-101879, together with an English language translation.

* cited by examiner

PRINTING SYSTEM, PRINTING DEVICE AND COMPUTER READABLE MEDIUM THEREFOR

CROSS-REFERENCE TO RELATED APPLICATION

This application claims priority under 35 U.S.C. §119 from Japanese Patent Application No. 2011-101879 filed on Apr. 28, 2011. The entire subject matter of the application is incorporated herein by reference.

BACKGROUND

1. Technical Field

The following description relates to a printing system including a printing device such as a printer, a copier, a facsimile machine, and an MFD (multi-function device), which is configured to perform a printing operation based on data acquired from a removable medium such as a USB (universal serial bus) memory, which is detachably attached to the printing device. The following description also relates to the printing device and a computer-readable recording medium storing a program for the printing device.

2. Related Art

The printing system as described above is convenient since a user can carry data to be printed simply by storing the data in a removable medium such as the USB memory, and the printing device can retrieves the data from the removable medium and prints out the retrieved data. However, it may occur that the user forgets to remove the removable medium after the printing operation is finished, and another person removes the removable medium. In such a case, leakage of data stored in the removable medium may occur.

To prevent such a problem, it is suggested to move the data stored in the removable medium to a storage area in the printing device (i.e., to transmit the data stored in the removable medium to the storage area of the printing device, and delete the data in the removable medium) when the removable medium is attached to the printing device. According to such a configuration, since all data stored in the removable medium is deleted, the leakage of the data can be prevented.

SUMMARY

Recently, a capacity of the removable medium is getting larger. Therefore, in a configuration that moves all data from the removable medium to a printer, such moved data might place a burden on a storage area of the printer. Additionally, if a capacity of the storage area of the printer is not large enough, all the data in the removable medium cannot be moved to the printer, and/or a performance of the printer might be getting worse due to insufficient capacity of the storage area.

Aspect of the present invention is advantageous in that a risk of an information leakage can be suppressed by moving data from a removable medium to outside of the removable medium without placing a burden on a storage area of a printer.

According to aspects of the present invention, there is provided a printing system comprising a printing device and a server configured to perform data communication with the printing device. The printing device in the printing system comprises a printing unit configured to print an image on a printing sheet, an attachment unit to which a removable medium is removably attached, a first communication interface configured to communicate with the server, and a first controller. The first controller is configured to acquire at least part of data in the removable medium attached to the attachment unit, controls the first communication interface to transmit the acquired data to the server, and delete the data in the removable medium corresponding to the acquired data. The server of the printing system comprises a second communication interface configured to communicate with the printing device, a server-side storage configured to store the acquired data, and a second controller configured to store the acquired data received by the second communication interface in the server-side storage.

According to further aspects of the invention, there is also provided a printing device employed in a printing system comprising the printing device and a server which comprises a server-side communication interface configured to communicate with the printing device, a server-side storage configured to store data transmitted from the printing device, and a controller configured to store the data received by the server-side communication interface in the server-side storage. The printing device comprises a printing unit configured to print an image on a printing sheet, an attachment unit to which a removable medium is removably attached, a device-side communication interface configured to communicate with the server, and a controller configured to acquire at least part of data in the removable medium attached to the attachment unit, control the device-side communication interface to transmit the acquired data to the server, and delete the data in the storage media corresponding to the acquired data.

According to further aspects of the invention, there is also provided a non-transitory computer readable medium storing computer readable instructions to cause a printing device, which comprises a communication interface configured to communicate with a server, to perform a data protection process by executing steps of acquiring at least part of data stored in a removable medium removably attached to an attachment unit of the printing device, transmitting the acquired data to the server through the communication interface, and deleting the data in the storage media corresponding to the acquired data.

BRIEF DESCRIPTION OF THE ACCOMPANYING DRAWINGS

FIG. 1 schematically shows an overall configuration of a printing system according to an aspect of the present invention.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the invention may be implemented in computer software as programs storable on computer-readable media including but not limited to RAMs, ROMs, flash memories, EEPROMs, CD-media, DVD-media, temporary storage, hard disk drives, floppy drives, permanent storage, and the like.

Hereinafter, an embodiment for implementing a printing system 1 according to aspects of the present invention will be described with reference to FIGS. 1 through 4. In the printing system 1 described hereinafter, a printer 2 is described as an example of a device having a printing function in the printing system 1. However, any devices having the printing function, such as a copying machine, a facsimile machine or a multi-functional device, could be used instead of the printer 2.

Figure 1:
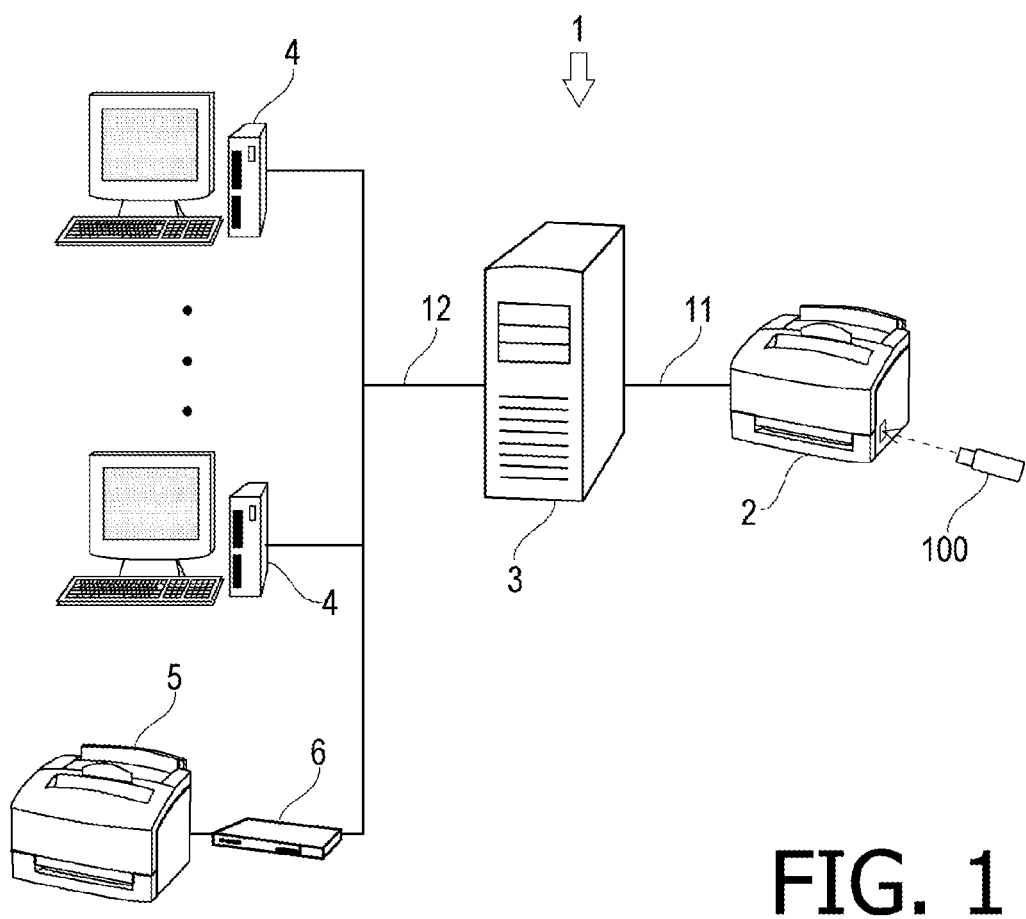

As shown in FIG. 1, the printing system 1 is provided with a printer 2, a server 3, one or more information terminal devices 4 (e.g., a PC, a PDA, a mobile phone, and a smartphone, etc.), a first communication line 11 that communicatably connects the printer 2 and the server 3, a second communication line 12 that communicatably connects the server 3 and the information terminal devices 4. Further, the printing system 1 is provided with one or more sets of a printer server 6 connected to the server 3 via the second communication line 12 and a printer 5 connected to the printer server 6. It is noted that the connection between the printer 2 and the server 3 may be made by a wireless communication, and in such a case, the first communication line 11 can be omitted.

(Printer 2)

Figure 2:
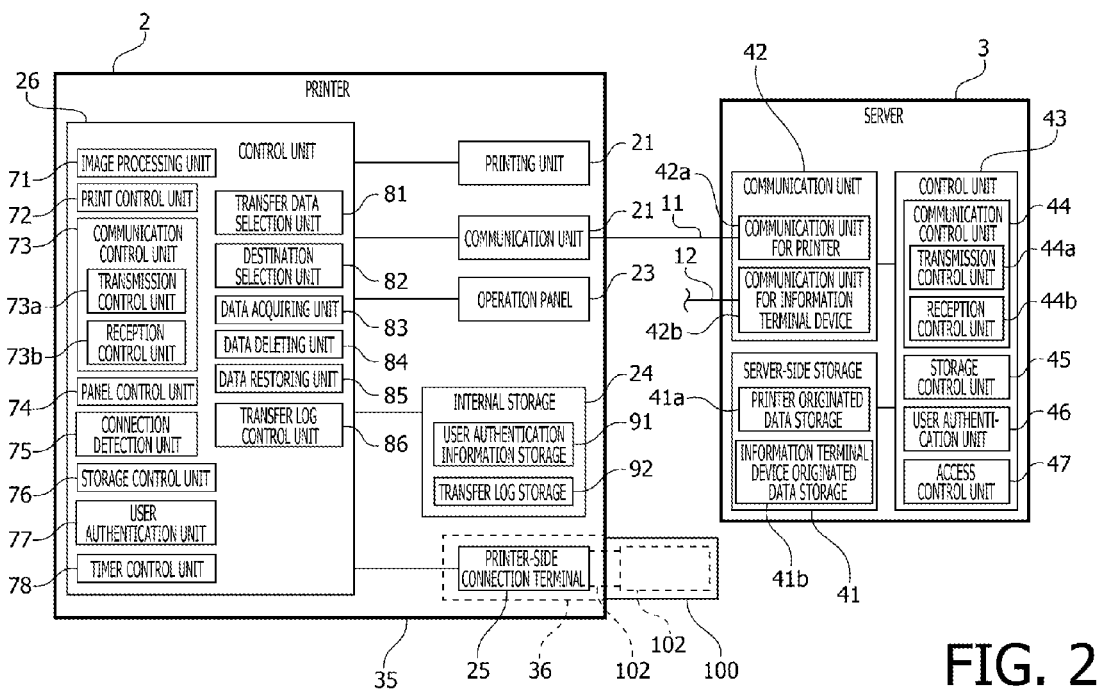
FIG. 2 is a block diagram schematically showing a principal configuration of a printer and a server according to an aspect of the present invention.
Figure 3:
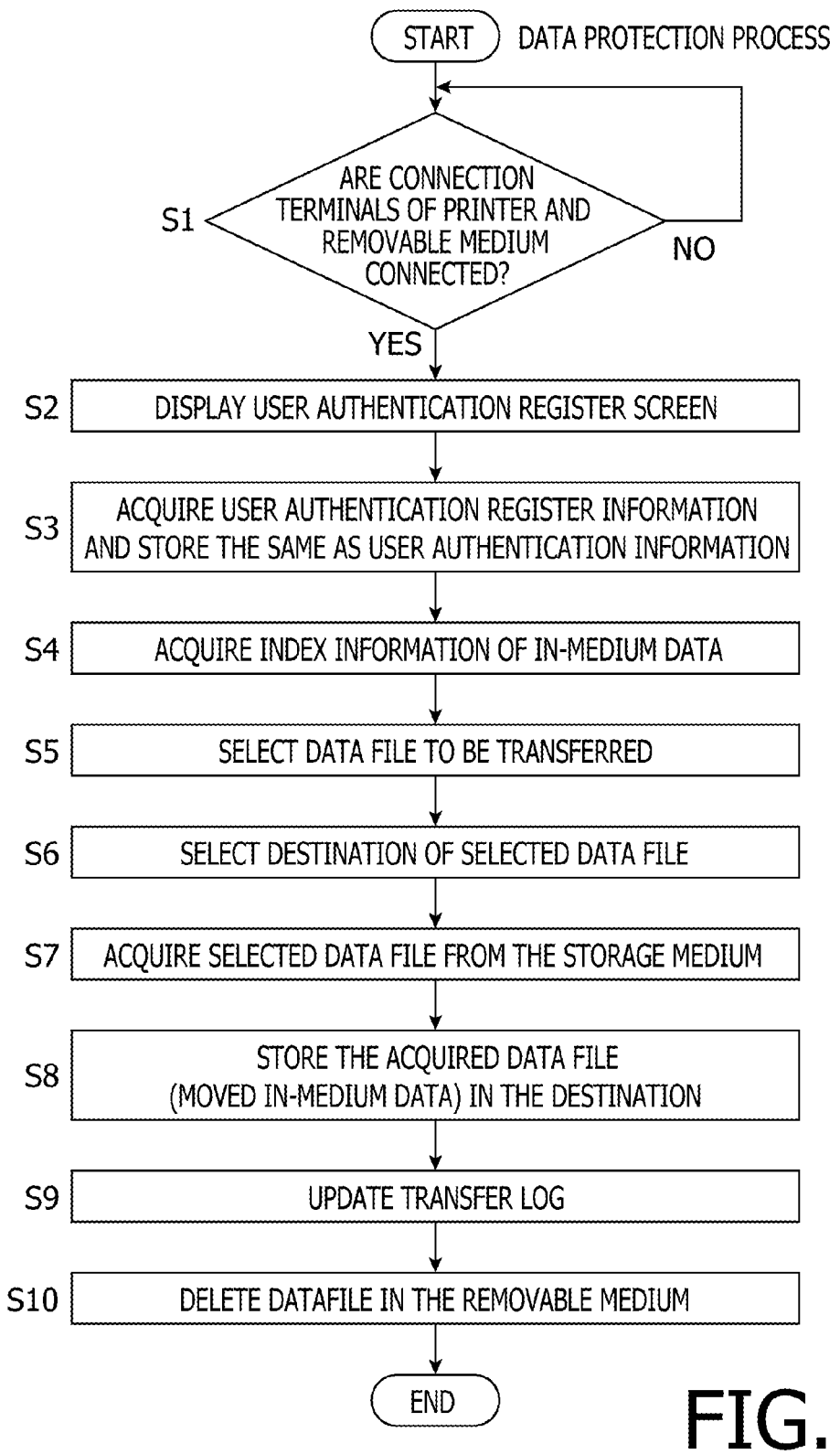
FIG. 3 is a flowchart illustrating a data protection process according to an aspect of the present invention.
Figure 4:
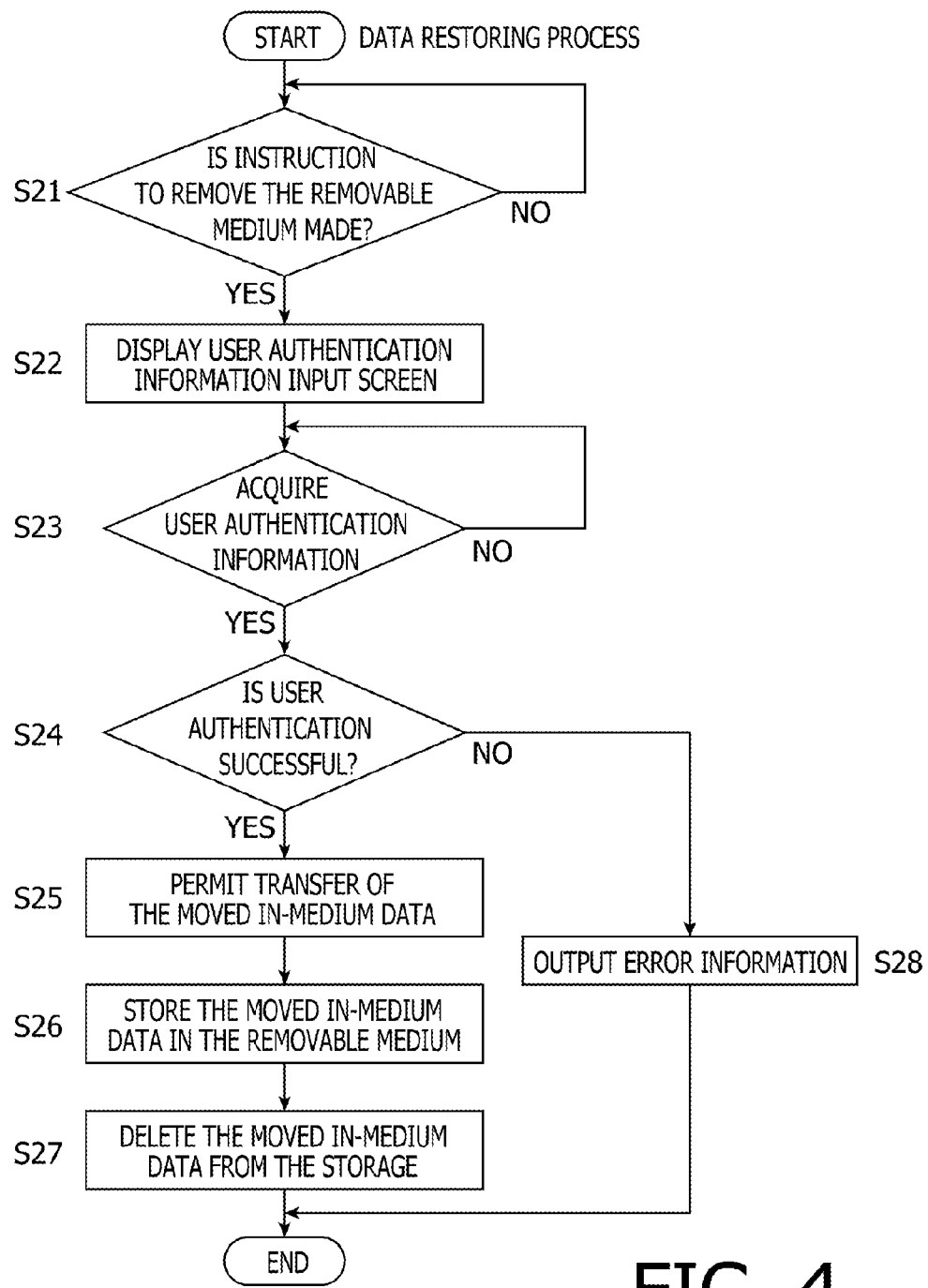
FIG. 4 is a flowchart illustrating a data restoring process according to an aspect of the present invention.

As shown in FIG. 2, the printer 2 is provided with a printing unit 21, a communication unit 22, an operation panel 23, an internal storage 24, a printer-side connection terminal 25, and a control unit 26 (as one example of a first controller) to control those functional units of the printer 2. The printer 2 further has a housing 35 to accommodate the function units. The housing 35 is provided with a slot 36 on the outer surface thereof. A removable medium 100 inserted into the slot 36 is connected with the printer-side connection terminal 25. The removable medium 100 includes any type of portable storage device (e.g., a USB memory, a memory card, etc.) having a memory 101 to store information.

The printing unit 21 has an image forming device and a printing sheet feeding device (not shown). The image forming device prints an image on the printing sheet that is fed by the sheet feeding device. The printing unit 21 can be any device having a function that prints an image on the printing sheet, and may be an ink-jet recording device or an electrophotographic recording device, etc.

The communication unit 22 is, for example, a well-known external communication interface that transmits and receives information to and from the server 3 via the first communication line 11 under control of a communication control unit 73 of the control unit 26. The first communication line 11 may be a bidirectional communication line such as a cable that enables a peer to peer bidirectional communication between the printer 2 and the server 3. It is noted that if the communication between the printer 2 and the server 3 is made by a wireless communication, the communication unit 22 may be a well-known external communication interface for wireless LAN or infrared communication.

The operation panel 23 is provided with a well-known input device such as a touch panel and/or hard keys (not shown) and capable of receiving a user operation to input commands or the like, which is transmitted to the control unit 26. The operation panel 23 is provided with a display device such as a liquid crystal display panel (not shown). The operation panel 23 may provide the user with information by displaying various screens on the display device under the control of the control unit 26, and receive a user input though soft keys displayed on the display device.

The internal storage 24 is a high capacity storage device that is capable of storing various data. The data stored in the internal storage 24 includes, for example, print data files acquired by the printer 2 and image output data files acquired or generated by the printer 2. It is noted that the term "print data" means vector data of the image including figures, pictures, texts and/or symbols to be formed on the printing sheet, and "image output data" means data to be outputted to the printing unit 21, generated by transforming (modifying) the print data to a raster image. The internal storage 24 includes a volatile memory, such as a RAM (Random Access Memory), for temporary storage and a nonvolatile memory, such as an HDD (Hard Disk Drive), for long-term storage. Further, a user authentication information storage 91 and a transfer log storage 93 are provided in a nonvolatile area of the internal storage 24.

The printer-side connection terminal 25 is an attachment unit to which the removable medium 100 is removably attached. The removable medium 100 has a memory 101 mounted on a body part and a medium-side connection terminal 102 mounted on a connection part. The printer-side connection terminal 25 is located in the back of the slot 36 to be connected with the medium-side connection terminal 102 of the removable medium 100 inserted into the slot 36.

The control unit 26 has one or more computers, each of which is provided with a CPU (Central Processing Unit), a ROM (Read Only Memory) for storing programs executed by the CPU and data used when the programs are executed, a RAM for temporarily storing data when the CPU executes the programs, a timer for counting a predetermined time in a process of the CPU, an interface to connect the CPU with an external device, and an internal path to connect those components in the control unit 26 (not shown). The programs executed by the CPU may be stored on various kinds of recording media such as a flexible disk, a CD-ROM, a memory card, and etc., and installed on the ROM from such recording media. Then, by executing the programs with the CPU, the functions of the control unit 26 described below are implemented. The control unit 26 has, at least an image processing unit 71, a print control unit 72, a communication control unit 73, a panel control unit 74, a connection detection unit 75, a storage control unit 76, a user authentication unit 77, a timer control unit 78, a transfer data selection unit 81, a destination selection unit 82, a data acquiring unit 83, a data deleting unit 84, a data restoring unit 85, a transfer log control unit 86 for constituting each function.

The image processing unit 71 performs an image processing so that the printing unit 21 performs printing. Specifically, the image processing unit 71 may generate image output data by performing the image processing based on the print data transmitted from the removable medium 100 or the server 3 connected to the printer 2, and modulate the image output data to more suitable data to be outputted by the printing unit 21 by performing the image processing based on the image output data. The image output data generated by the image processing unit 71 is stored in the internal storage 24 as an image output data file.

The print control unit 72 controls a behavior of the printing unit 21. Specifically, the print control unit 72 may control behaviors of the image forming device and the printing sheet feeding device of the printing unit 21 so that an image corresponding to print data is formed on a printing sheet based on the image output data.

The communication control unit 73 controls a behavior of the communication unit 22 and includes a transmission control unit 73a and a reception control unit 73b. Specifically, the transmission control unit 73a controls the communication unit 22 to transmit data stored in the internal storage 24 to the server 3 and the reception control unit 73b controls the communication unit 22 to receive data transmitted from the server 3 to the printer 2. The transmission control unit 73a transmits data (a signal) to a control unit 43 of the server 3 for requesting an operation thereof. Incidentally, the transmission control unit 73a may control the communication unit 22 to transmit data in the control unit 26 of the printer 2 to the server 3.

The panel control unit 74 controls the operation panel 23. Specifically, the panel control unit 74 may input a user operation received through the operation panel 23 to the control unit 26 and control the operation panel 23 to display an output from the control unit 26.

The connection detection unit 75 detects a connection and a disconnection between the medium-side connection terminal 102 of removable medium 100 and the printer-side connection terminal 25. Specifically, the connection detection unit 75 judges a connection between the printer-side connection terminal 25 and the removable medium 100 by detecting a status of a detection element mounted on the printer-side connection terminal 25 or receiving a connection signal from the removable medium 100.

The storage control unit 76 stores data in the internal storage 24. Specifically, the storage control unit 76 stores data received by the communication unit 22 under the control of the reception control unit 73b in the internal storage 24. Additionally, the storage control unit 76 stores data acquired from the removable medium 100 in the internal storage 24. The functions of the transfer data selection unit 81, the destination selection unit 82, the data acquiring unit 83, the data deleting unit 84, the data restoring unit 85, the user authentication unit 77 and the timer control unit 78 will be described later.

(Server 3)

The server 3 is a computer functioning as a so-called printer server, used when the plurality of information terminal device 4 uses the printer 2 on a computer network. Additionally, the server 3 undertakes a role of storing data transmitted from the printer 2. As shown in FIG. 2, the server 3 is provided with a server-side storage 41, a communication unit 42, and a control unit 43 (as one example of a second controller) to control those units.

The server-side storage 41 is a high capacity storage device that is capable of storing various data. The server-side storage 41 includes a volatile memory such as a RAM for temporary storage and a nonvolatile memory such as an HDD for long-term storage. The server-side storage 41 includes a printer originated data storage 41a to store information received from the printer 2 and an information terminal device originated data storage 41b to store print data received from one or more information terminal devices 4.

The communication unit 42 includes a communication unit for printer 42a for transmitting and receiving the information to and from the printer 2 via the first communication line 11, and a communication unit for information terminal device 42b for transmitting and receiving information to and from one or more information terminal device 4 via the second communication line 12, under the control of the communication control unit 44 of the control unit 43. The communication unit for printer 42a and the communication unit for information terminal device 42b are well-known external communication interface devices. The second communication line 12 may be a computer network such as LAN, etc. It is noted that if a communication between the printer 2 and the server 3 is made by a wireless communication, the communication unit for printer 42a may be an external output communication interface device for a well-known wireless LAN or an infrared communication. The same applies for the communication unit for information terminal device 42b.

The control unit 43 is provided with a CPU, a ROM (EEPROM) for rewritably storing programs executed by the CPU and data used in the program, a RAM for temporary storing data and functioning as a working area when the CPU executes the program, and an internal path to connect those elements in the control unit 43 (not shown). The programs executed by the CPU are stored on various kinds of recording media such as a flexible disk, a CD-ROM, and a memory card, etc., and installed on the ROM from such recording media. Then, by executing the programs with the CPU, the functions of the server 3 are implemented. The control unit 43 includes at least a communication control unit 44, a storage control unit 45, a user authentication unit 46, and an access control unit 47 to constitute each function. Further, the control unit 43 provides a security regarding retrieving of information stored at least in the printer originated data storage 41a of the server-side storage 41 with an account management or an access control. For example, the control unit 43 of the server 3 manages an account of a user who is permitted to access the printer originated data storage 41a of the server-side storage 41. Then, the control unit 43 provides a system manager who is authorized by the user account and a person corresponding thereto with an access authority to access the printer originated data storage 41a. Further, the control unit 43 of the server 3 performs an arbitrary access control to the printer originated data storage 41a. In this regard, an access that is more limited than an access designated by the system manager with respect to its resource is authorized to a user of an external computer (e.g., a user of the information terminal device 4 or the printer 2).

The communication control unit 44 controls a behavior of the communication unit 42 and includes a transmission control unit 44a and a reception control unit 44b. Specifically, the transmission control unit 44a controls the communication unit 42 to transmit data stored in the server-side storage 41 to the printer 2 or the information terminal device 4 based on a request from the printer 2 or the information terminal device 4. The reception control unit 44b controls the communication unit 42 to receive data transmitted from the printer 2 to the server 3.

The storage control unit 45 stores data in the server-side storage 41. Specifically, the storage control unit 45 stores the data received by the communication unit 42 under the control of the reception control unit 44b in the server-side storage 41. The functions of the user authentication unit 46 and the access control unit 47 will be described later.

(Data Protection Function)

The printing system 1 has a function that protects information, particularly confidential information, stored in the removable medium 100 connected to the printer 2 to prevent such information from leaking to the third party. The data protection function of the printing system 1 is achieved mainly by cooperating each function of the control unit 26 of the printer 2 and the control unit 43 of the server 3. Hereinafter, the data protection function of the printing system 1 is described in accordance with the processing flow with reference to FIGS. 2 and 3.

Firstly, in order to perform printing of print data (data file) stored in the removable medium 100 by the printer 2, the user inserts the removable medium 100 into the slot 36 of the printer 2. The connection detection unit 75 detects a connection between the printer-side connection terminal 25 and the medium-side connection terminal 102 caused by the insertion of the removable medium 100 into the slot 36 (S1: YES). In response to the detection by the connection detection unit 75, the user authentication unit 77 makes the operation panel 23 display a user authentication information register screen under the control of the panel control unit 74 (S2). The user authentication information register screen includes at least a message for requesting an input of user authentication register information to be registered as user authentication information including at least an ID and a password, and an entry field for inputting the user authentication register information. The user authentication unit 77 acquires the user authentication register information (e.g., the ID and the password) inputted on the user authentication information register screen and received by the communication control unit 44, and stores the same in the user authentication information storage 91 (S3).

Subsequently, in the printing system 1, data stored in the memory 101 of the removable medium 100 (hereinafter, referred as "in-medium data") is transferred (moved) to the internal storage 24 or the server-side storage 41. It is noted that, hereinafter, the in-medium data indicates data of an image or a document stored in a rewritable area of the removable medium 100 to which writing and deleting of the data can be made from the outside. As a preparation for a transfer of the in-medium data, the transfer data selection unit 81 firstly accesses the memory 101 of the removable medium 100 and acquires index information of each data file of the in-medium data stored therein (S4). The index information includes at least a name, a type, a size and a security level of each data file.

The data acquiring unit 83 may transfer all data files in the in-medium data or a subset of data files selected by the transfer data selection unit 81 from the removable medium 100 to the printer 2. Whether to transfer a subset of the data files selected from the in-medium data or all data files in the in-medium data can be determined depending on a design of the printing system 1 or a policy of the user or the system manager of the printing system 1.

When a subset of the data files is to be transferred, the transfer data selection unit 81 selects one or more data files to be transferred from the in-medium data based on a predetermined priority for protection (S5). Specifically, the transfer data selection unit 81 generally determines the priority for protection of each data file in the in-medium data based on the index information acquired from the removable medium 100. Then, the transfer data selection unit 81 selects one or more data files to be transferred based on the priority for protection (e.g., one or more data files having a high priority for protection are selected). If the all data files in the in-medium data have a high priority for protection, the all data files in the in-medium data may be selected to be transferred.

The priority for protection is determined with an emphasis on confidentiality of the data file. For example, if the security level included in the index information of the data file is high (e.g., equal to or higher than the middle level, where the security level includes three levels of high, middle, and low), the priority for protection of such a data file can be determined to be high. Additionally, the priority for protection may be determined depending on a type of the data file. In this case, the priority for protection of one or more specific types of data file can be determined to be high. Further, if a name of the data file includes a specific character string, the priority for protection of such a data file may be determined to be high. Additionally, if the memory 101 of the removable medium 100 stores a folder having a predetermined name, the priority for protection of a data file in such a folder can be determined to be high. It is noted that the priority for protection can be determined suitably depending on a situation where the printing system 1 is provided, not limited to the above examples.

Additionally or alternatively, a user can select one or more data files to be transferred from the in-medium data. In this case, the transfer data selection unit 81 makes the operation panel 23 display a screen for requesting the user to select one or more data files to be transferred together with the index information of the in-medium data, and receives the user input through the operation panel 23 under the control of the panel control unit 74. Then, the transfer data selection unit 81 selects one or more data files selected by the user as the data files to be transferred. Further, when the printing system 1 is designed to transfer all data files in the in-medium data, the transfer data selection unit 81 selects all data files in the in-media data in S5.

Subsequently, in the printing system 1, the selected data files may be transferred from the removable medium 100 to one of or both of the printer originated data storage 41a of the server-side storage 41 and the nonvolatile memory area of the internal storage 24. In principal, the selected data files are transferred from the removable medium 100 to the server-side storage 41. However, a destination (for storing) of the selected data files may be set to the internal storage 24 depending on contents of the selected data files or a free space of the internal storage 24. Although the printer 2 is provided with the internal storage 24 in the present embodiment, in case where the printer 2 is not provided with any storages or a capacity of the storage of the printer 2 is small, the selected data files are transferred to the server-side storage 41. Additionally, in the printing system 1, it is possible to transfer each of the selected data files to difference destinations (e.g., a subset of the selected data files is transferred to the internal storage 24 and another subset of the selected data files is transferred to the server-side storage 41), or to transfer the selected data files in a lump to the internal storage 24 or the server-side storage 41.

The destination selection unit 82 selects a destination of the selected data files from the internal storage 24 and the server-side storage 41 (S6). Specifically, the destination selection unit 82 generally selects the destination of the selected data files based on the index information and a predetermined destination selection indicator of each data file.

The destination selection indicator is determined with an emphasis on a size (i.e., a burden to the memory of the internal storage 24) and a type (i.e., a possibility that the data file will be printed) of the data file. For example, when the destination selection indicator is determined based on the size of the data file, the destination selection unit 82 may select the server-side storage 41 as a destination of the data file of which size is equal to or more than a predetermined value, and select the internal storage 24 as a destination of the data file of which size is less than the predetermined value. Additionally, for example, when the destination selection indicator is determined based on a free space of the internal storage 24 and a size of the related data file, the destination selection unit 82 may select the server-side storage 41 as a destination of the data file, if the size of the data file would take over a predetermined part of the free space of the internal storage 24 or if the amount of the free space of the internal storage 24 becomes equal to or less than a predetermined value when the data file is transferred to the internal storage 24. Further, for example, when the destination selection indicator is determined based on the type of the data file, the destination selection unit 82 may select the server-side storage 41 as a destination of one or more types of the data file which are unlikely to be printed, and select the internal storage 24 as a destination of the other types of the data file which are likely to be printed to based on an extension of the data file. Still further, for example, when the destination selection indicator is determined based on the name of the data file, the destination selection unit 82 may select the server-side storage 41 as a destination of the data file which includes a specific character string in its name, and select the internal storage 24 as a destination of the other data files. Still further, for example, when the destination selection indicator is determined based on an attribute of the data file (e.g., read-only, hidden file) or basic information of the data file (e.g., a title, category, comment, and author), the destination selection unit 82 may select the server-side storage 41 as a destination of the data file having a high priority, and select the internal storage 24 as a destination of the other data file. Still further, for example, when the destination selection indicator may be determined based on a folder in the memory 101 of the removable medium 100 in which the data file is stored, the destination selection unit 82 may select the server-side storage 41 as a destination of the data file stored in a folder having a first predetermined name and select the internal storage 24 as a destination of the data file stored in a folder having a second predetermined name.

Additionally or alternatively, a user can select a destination of the selected data files. In this case, the destination selection unit 82 makes the operation panel 23 display a destination selection information input screen for requesting the user to select a destination together with the index information of the selected data files, and receives the user operation through the operation panel 23 under the control of the panel control unit 74. Then, the destination selection unit 82 selects the destination selected by the user on the destination selection information input screen as the destination of the selected data files. Thus, by allowing a user to select a destination, the data may be transferred in accordance with the user's intention. Additionally, since the destination of the data is clear, it is easy for the user to access the data after the transfer.

After one or more data files to be transferred are selected from the in-medium data and a destination of such data files is selected as described above, the data acquiring unit 83 acquires the selected data files from the removable medium 100 and temporary stores the same into the RAM of the control unit 26 (S7). Hereinafter, the data files acquired from the removable medium 100 is referred as "moved in-medium data." Then, in the printing system 1, the moved in-medium data is stored at the selected destination (S8). In this regard, if the server-side storage 41 is selected as the destination, the transmission control unit 73a controls the communication unit 22 to transmit the moved in-medium data to the server 3 via the first communication line 11. The reception control unit 44b of the server 3 controls the communication unit 42 to receive the moved in-medium data and the storage control unit 45 stores the moved in-medium data in the printer originated data storage 41a of the server-side storage 41. On the other hand, if the internal storage 24 is selected as the destination, the storage control unit 76 stores the moved in-medium data in the internal storage 24. It is noted that the moved in-medium data is stored in association with the user authentication information (the user authentication register information) stored in the user authentication information storage 91 at S3 irrespective of the destination. Specifically, a new data folder is generated at the destination of the moved in-medium data, and the user authentication information is stored in association with the moved in-medium data as authentication information used for retrieving and transferring the data file stored in the generated data folder. Thus, the moved in-medium data stored in the destination is managed so that only a user authorized by the user authorization can access the data. Subsequently, when the storage operation of the moved in-medium data in the destination is completed, the transfer log control unit 86 updates (or generates if at the first time) the transfer log (S9). The transfer log is stored in the transfer log storage 92. The transfer log includes a transfer number that is specific to the transfer of the moved in-medium data, the transfer date and time, the destination, the names of the data files included in the moved in-medium data, the associated user authentication information.

Finally, the data deleting unit 84 deletes the data files, which corresponds to the moved in-medium data that has been transferred to the destination, from the memory 101 of the removable medium 100 (S10). Thus, the data files selected at S6 are transferred to the server-side storage 41 or the internal storage 24 and not remained in the memory 101 of the removable medium 100.

Then, the printer 2 performs printing using the moved in-medium data stored in the server-side storage 41 or the internal storage 24. In this regard, the user may input an instruction regarding a print job to the printer 2 and a designation of an image for the print job to the control unit 26 of the printer 2 through the operation panel 23. The user may designate the data file included in the moved in-medium data or another data file as the subject for the print job. Then, the print control unit 72 controls the printing unit 21 to perform the print job in response to the instruction from the user through the operation panel 23. If the data file for the print job is stored in the server-side storage 41, the communication control unit 73 transmits a signal for requesting a transmission of the data file to the server 3, and the communication unit 42 of the server 3 receives the signal under the control of the reception control unit 44b. Subsequently, the transmission control unit 44a controls the communication unit 42 to transmit the data file stored in the server-side storage 41 to the printer 2, and the reception control unit 73b of the printer 2 controls the communication unit 22 to receive the data file. Then, the image processing unit 71 generates image output data based on the data file received by the communication unit 22.

As described above, when the removable medium 100 is inserted into the slot 36 of the printer 2, the data protection process is performed in the printing system 1. Specifically, in the data protection process, the in-medium data (i.e., all data files or selected data files) stored in the removable medium 100 is automatically moved to the server-side storage 41 or internal storage 24. According to this configuration, even if the user left the removable medium 100 attached to the printer 2, reading and using of the in-medium data of the removable medium 100 by another person can be prevented. That is, a risk of the information leakage from the removable medium 100 can be reduced. Especially, by configuring that the data deleting unit 84 deletes the all data stored in the removable medium 100 after the data acquiring unit 83 acquires the all data from the removable medium 100, the risk of the information leakage can be certainly reduced. In addition, in a configuration that a part of the in-medium data (i.e., a subset of data files) in the removable medium 100 is transferred to the server-side storage 41 or the internal storage 24 based on the priority for protection, by acquiring the data having a high priority in advance, the risk of the information leakage can be certainly reduced. Further, according to a configuration not to acquire the data having a low priority, a time necessary for transmitting/receiving the data can be shortened.

Additionally, in the printing system 1 described above, the server-side storage 41 is provided as a destination of the in-medium data as well as the internal storage 24. Then, a destination of the transfer of the data may be selected from them depending on the in-medium data. According to this configuration, by storing the data corresponding to an image to be printed on the printing sheet in the destination that can be accessed in high speed, an efficiency of printing operation can be improved. Additionally, by storing the large size of data in a destination with a high capacity, a trouble such as an overflow of the data from the memory can be prevented.

Especially, by transferring the in-medium data from the removable medium 100 to the server-side storage 41, the protection of the in-medium data can be achieved without a stress to the storage area of the printer 2 and a reduction of the processing capacity of the printer 2 even when the size of the in-medium data is large. Further, since the server-side storage 41 has, or may have easily, a security level higher than that of the internal storage 24, the protection of the in-medium data can be achieved in the higher security level. Therefore, by transferring the data requiring the high security level to the destination with the high security level, the risk of the information leakage can be reduced.

Additionally, the printer 2 initiates the print job after the in-medium data in the removable medium 100 is transferred to the server-side storage 41 or the internal storage 24. Therefore, the removable medium 100 can be removed before the print job is terminated.

In the above described data protection process, the in-medium data is transferred to the server-side storage 41 or the internal storage 24 immediately after the removable medium 100 is attached to the printer 2. According to this configuration, an amount of time from the connection between the printer 2 and the removable medium 100 until the completion of the transfer of the in-medium data to the destination is short. Therefore, it is preferable to move the in-medium data to the outside of the removable medium 100 such a timing for protecting the in-medium data. However, a timing of the transfer of the in-medium data is not limited to the above. For example, after the removable medium 100 is connected to the printer 2 and the user selects the data to be printed from the in-medium data in the removable medium 100, the data to be printed may only be transferred from the removable medium 100 to the server-side storage 41 or the internal storage 24. Additionally, or alternatively, the timer control unit 78 starts the timer when the connection detection unit 75 detects the connection between the removable medium 100 and the printer 2, and the in-medium data may be transferred to the server-side storage 41 or the internal storage 24 after a predetermined time has passed. Additionally, or alternatively, the timer control unit 78 starts the timer when the print job is terminated while the removable medium 100 has been connected to the printer 2, and the in-medium data may be transferred to the server-side storage 41 or the internal storage 24 after a predetermined time has passed. According to this configuration, the in-medium data can be moved only when there is a possibility that the user leaves the printer 2, for example, when it takes a long time for printing due to a large amount of the print job or the removable medium 100 is left while attaching to the printer 2.

(Restoring of the Transferred Data)

The printer 2 is able to restore the in-medium data deleted from the removable medium 100 in the data protection process to the removable medium 100. The restoring process of the in-medium data is described below with reference to a flowchart shown in FIG. 4.

The operation panel 23 is provided with a medium removal key implemented by a hard key or a soft key (not shown). When the user operates the medium removal key of the operation panel 23 while the removable medium 100 is inserted into the slot 36 before, during or after the print job, it is recognized that the medium removal instruction is made (S21: YES), and the user authentication unit 77 performs the user authentication. Specifically, the user authentication unit 77 firstly makes the operation panel 23, under the control of the panel control unit 74, display a user authentication information input screen having an entry field for inputting user authentication information including at least an ID and a password to request the user to input the user authentication information (S22). When the panel control unit 74 receives the user authentication information inputted on the user authentication information input screen by the user (S23), the user authentication unit 77 judges whether the transfer log stored in the transfer log storage 92 includes user authentication information that is matched with the inputted user authentication information. If the transfer log stored in the transfer log storage 92 includes the user authentication information that is matched with the inputted user authentication information, it is judged that the user authentication is successful (S24: YES). On the other hand, if the transfer log stored in the transfer log storage 92 does not include the user authentication information that is matched with the inputted user authentication information, it is judged that the user authentication is failed (S24: NO).

If the user authentication is failed (S24:NO), the user authentication unit 77 makes the operation panel 23 output an error information under the control of the panel control unit 74 (S28). On the other hand, if the user authentication is successful (S24:YES), the user authentication unit 77 specifies the moved in-medium data stored in the server-side storage 41 or the internal storage 24 based on a set of information stored in the transfer log in association with the user authentication information. Then, the user authentication unit 77 permits a transfer of the moved in-medium data to the removable medium 100 (S25). Then, the corresponding moved in-medium data is transferred from the server-side storage 41 or the internal storage 24 to the removable medium 100 through the data restoring unit 85 in the printing system 1 (S26). The data restoring unit 85 stores the moved in-medium data into the memory 101 so that the moved in-medium data is restored in the removable medium 100. The restored moved in-medium data is then deleted from the storage, that is the server-side storage 41 or the internal storage 24 (S27). When the moved in-medium data stored in the server-side storage 41 is restored, the communication control unit 73 transmits a signal to the server 3 for requesting transfer and deletion of the moved in-medium data and the reception control unit 44b of the server 3 controls the communication unit 42 to receive the signal. Then, the transmission control unit 44a transmits the moved in-medium data stored in the server-side storage 41 to the printer 2, and the storage control unit 45 deletes the moved in-medium data from the server-side storage 41. The reception control unit 73b of the printer 2 controls the communication unit 22 to receive the moved in-medium data from the server 3 and the data restoring unit 85 restores the same in the removable medium 100.

On the other hand, if the medium removal instruction is not made (S21: NO) or the user authentication is failed (S24: NO), the moved in-medium data is not restored in the removable medium 100. If the medium removal instruction is made during the transfer of the moved in-medium data from the removable medium 100 to the server-side storage 41 or the internal storage 24, the transfer of the in-medium data is suspended, and the in-medium data which has been transferred to the server-side storage 41 or the internal storage 24 is restored in the removable medium 100.

As described above, in the printing system 1, the in-medium data in the removable medium 100 attached to the printer 2 is deleted but the deleted in-medium data can be restored when the user authentication is successful. According to this configuration, an owner of the data deleted from the removable medium 100 can recover the deleted data.

(Usage of the Transferred Data)

The moved in-medium data transferred to the server-side storage 41 in the data protection process may be maintained in the server-side storage 41 without restoring to the removable medium 100. In this case, one or more information terminal devices 4 (a PC, a PDA, a mobile phone, and a smartphone, etc.,) or the printer 5 connected to the server 3 via the second communication line 12 may access to the server-side storage 41 to retrieve and delete the moved in-medium data, as well as the printer 2. In this regard, the access control unit 47 of the control unit 43 of the server 3 controls an access from the information terminal device 4 or the printer 5 to a predetermined folder in the server-side storage 41.

The moved in-medium data is stored in the data folder generated in the printer originated data storage 41a of the server-side storage 41. An access to the data folder is arbitrarily controlled by the control unit 43 of the server 3. The user, who is trying to retrieve the moved in-medium data stored in the printer originated data storage 41a of the server-side storage 41, accesses a desired data folder (target folder) in the printer originated data storage 41a of the server-side storage 41 of the server 3 from a communication unit of the information terminal device 4 via the second communication line 12. In this regard, the user authentication unit 46 of the server 3 requests the information terminal device 4 which accesses to the server 3 to transmit user authentication information including at least an ID and a password. In response to the request, the user transmits the user authentication information from the information terminal device 4 to the server 3 via the second communication line 12. The user authentication unit 46 of the server 3 receives the user authentication information transmitted from the information terminal device 4, and judges whether the received user authentication information matches the user authentication information associated with the target folder. If it is judged to match, the user authentication is successful, and otherwise, the user authentication is failed. If the user authentication is successful, the access control unit 47 permits a transfer of the moved in-medium data stored in the target folder from the server 3 to the authorized information terminal device 4. Then, the transmission control unit 44a of the server 3 controls the communication unit for information terminal device 42b to transmit the moved in-medium data stored in the target folder to the authorized information terminal device 4. In this regard, the authorized user of the information terminal device 4 may delete the moved in-medium data stored in the target folder.

As described above, in the printing system 1, the information terminal devices 4 or the printer 5 connected to the server 3 via the second communication line 12 may use the moved in-medium data transferred to the server-side storage 41 from the removable medium 100 by the printer 2, as well as the printer 2. Therefore, the moved in-medium data stored in the server-side storage 41 may be shared by more than one person by sharing the user authentication information among them, for example. Additionally, the moved in-medium data can be transferred to a removable medium attached to the printer 5 by retrieving the moved in-medium data stored in the server-side storage 41 and storing the same to the removable medium attached to the printer 5. As described above, there are different variations on restoring the moved in-medium data in the printing system 1 according to the present embodiment. Thus, a convenience of the data usage by the user can be improved.

It is to be understood that the subject matter defined in the appended claims is not necessarily limited to the embodiment described in the above paragraphs and appended figures. For example, various kinds of modifications may fall within the spirit and scope of the invention as set forth in the appended claims.

For example, in the above embodiment, the user authentication information storage 91 and the transfer log storage 92 is located in the nonvolatile area of the internal storage 24. However, they may be located in the nonvolatile area of the server-side storage 41.

Additionally, in the above embodiment, the user authentication unit 77 makes the operation panel 23 display the user authentication information register screen under the control of the panel control unit 74. However, such a process can be omitted by registering the user authentication information in the removable medium 100 in advance. In this regard, it is desired to protect the user authentication information stored in the removable medium 100 with an encryption process so as to prevent such information from being recognized by the third party easily.

Further, in the above embodiment, the index information of each data file in the in-medium data includes a name, a type, a size and a security level of the data file. However, some of the above information may not be included in the index information. For example, the security level of the data file may not be included in the index information. In this case, the security level is calculated (determined) based on the name and the type of the data file.

Further, in the above embodiment, the data acquiring unit 83 acquires the in-medium data from the removable medium 100 and temporary stores the acquired data in the RAM of the control unit 26. However, in view of the limited capacity of the RAM, the data acquiring unit 83 may store a part of the in-medium data in the RAM, transfer the same to the destination, and store another part of the in-medium data in the RAM to repeat those steps. Additionally or alternatively, the in-medium data may be stored in the internal storage 24, not in the RAM.

In the above-described embodiment, single CPU may perform all of the processes. Nevertheless, the disclosure may not be limited to the specific embodiment thereof, and a plurality of CPUs, a special application specific integrated circuit ("ASIC"), or a combination of a CPU and an ASIC may be used to perform the processes.

What is claimed is:

1. A printing system comprising a printing device and a server configured to perform data communication with the printing device, wherein the printing device comprises:
a printing unit configured to print an image on a printing sheet;
an attachment unit to which a removable medium is removably attached;
a first communication interface configured to communicate with the server; and
a first controller configured to:
acquire at least part of data in the removable medium attached to the attachment unit;
control the first communication interface to transmit the acquired data to the server; and
delete the data in the removable medium corresponding to the acquired data, and the server comprises:
a second communication interface configured to communicate with the printing device;
a server-side storage configured to store the acquired data; and
a second controller configured to store the acquired data received by the second communication interface in the server-side storage, wherein the first controller deletes the data in the removable medium corresponding to the acquired data after the second controller stores the acquired data received by the second communication interface in the server-side storage, and
wherein the printing unit executes printing using the acquired data stored in the server-side storage after the data in the removable medium corresponding to the acquired data has been deleted from the removable medium.

2. The printing system according to claim 1, wherein:
the first controller is configured to acquire all data in the removable medium, and
delete the all data from the removable medium.

3. The printing system according to claim 1,
wherein the first controller is configured to determine a priority for protection of the data in the removable medium based on at least one of a security level that is predetermined to the data in the removable medium, a type of the data, and a character string included in a name of the data, and selectively acquire the data in the removable medium based on the priority for protection.

4. The printing system according to claim 1, wherein the printing device further comprises an internal storage configured to store the acquired data, and
wherein the first controller is further configured to:
store the acquired data in the internal storage; and
determine a destination to which the acquired data is stored, the destination being one of the server-side storage and the internal storage,
wherein,
(1) when the determined destination is the internal storage, the acquired data is stored in the internal storage, or
(2) when the determined destination is the server-side storage, the acquired data is transmitted to the server by the first communication interface under the control of the first controller, the acquired data being stored in the server-side storage by the second controller.

5. The printing system according to claim 4, wherein first controller is configured to determine the destination based on at least one of a security level that is predetermined to the data in the removable medium, a type of the data, and a size of the data, and a destination selection indicator determined based of the one of the security level, the type and the size of the data.

6. The printing system according to claim 4,
wherein the first controller is further configured to:
receive a user selection of a destination to which the acquired data is stored; and
determine the destination based on the user selection.

7. The printing system according to claim 1,
wherein the second controller is further configured to control the second communication interface to transmit the acquired data stored in the server-side storage to the printing device, and
wherein the first controller is further configured to restore the acquired data transmitted from the server into the removable medium so that the data deleted by the first controller is restored.

8. The printing system according to claim 4,
wherein the second controller is further configured to control the second communication interface to transmit the acquired data stored in the server-side storage to the printing device, and
wherein the first controller is further configured to restore at least one of the acquired data transmitted from the server and the acquired data stored in the internal storage into the removable medium so that the data deleted by the first controller is restored.

9. The printing system according to claim 7,
wherein the acquired data is stored in association with user authentication information,
wherein the printing device further comprises a user authentication information receiving unit configured to receive an input of user authentication information from a user, and
wherein the first controller is further configured to:
perform a user authentication based on the user authentication information received by the user authentication information receiving unit and the user authentication information associated with the acquired data, and
restore the acquired data into the removable medium when the user authentication is successful.

10. The printing system according to claim 8,
wherein the acquired data is stored in association with user authentication information,
wherein the printing device further comprises a user authentication information receiving unit configured to receive an input of user authentication information from a user, and
wherein the first controller is further configured to:
perform a user authentication based on the user authentication information received by the user authentication information receiving unit and the user authentication information associated with the acquired data, and
restore the acquired data into the removable medium when the user authentication by the user authentication unit is successful.

11. The printing system according to claim 9,
wherein the printing device further comprises a user authentication register information receiving unit that receives a registration of the user authentication information to be stored in association with the acquired data from a user when the first controller acquires the data from the removable medium.

12. The printing system according to claim 10,
wherein the printing device further comprises a user authentication register information receiving unit that receives a registration of the user authentication information to be stored in association with the acquired data from a user when the first controller acquires the data from the removable medium.

13. The printing system according to claim 1, wherein the printing system further comprises one or more information terminal devices including a third communication interface configured to communicate with the server,
wherein the server further comprises a fourth communication interface configured to communicate with the one or more information terminal devices, and
wherein the second controller is further configured to control the fourth communication interface to transmit the acquired data stored in the server-side storage to at least one of the information terminal device in response to a request from the at least one of the information terminal device.

14. The printing system according to claim 13, wherein the second controller is further configured to control an access from the one or more information terminal devices to the server-side storage.

15. The printing system according to claim 4,
wherein the first controller is configured to determine the destination based on a size of the data, the first controller determining that the destination is the server-side storage when the size of the data is equal to or greater than a predetermined value, the first controller determining that the destination is the internal storage when the size of the data is less than a predetermined value.

16. The printing system according to claim 4, wherein the first controller is configured to determine the destination based on whether a size of the data would take over a predetermined part of a free space of the internal storage, the first controller determining that the destination is the server-side storage if the size of the data would take over a predetermined part of a free space of the internal storage, and the first controller determining that the destination is the internal storage if the size of the data would not take over a predetermined part of a free space of the internal storage.

17. The printing system according to claim 4, wherein the first controller is configured to determine the destination based on an amount of the free space of the internal storage if the data is stored in the internal storage, the first controller determining that the destination is the server-side storage when the amount of the free space is equal to or less than the predetermined amount, and the first controller determining that the destination is the internal storage when the amount of the free space is greater than the predetermined amount.

18. The printing system according to claim 4, wherein the first controller is configured to determine the destination based on whether the data is likely to be printed, the first controller determining that the destination is the server-side storage when the data is unlikely to be printed, and the first controller determining that the destination is the internal storage when the data is likely to be printed.

19. The printing system according to claim 4, wherein the first controller is configured to determine the destination based on whether a file name of the data includes a predetermined character string, the first controller determining that the destination is the server-side storage when the file name of the data includes the predetermined character string, and the first controller determining that the destination is the internal storage when the file name of the data does not include the predetermined character string.

20. The printing system according to claim 4, wherein the first controller is configured to determine the destination based on a priority assigned to the data, the first controller determining that the destination is the server-side storage when the priority assigned to the data is high, and the first controller determining that the destination is the internal storage when the priority assigned to the data is low.

21. The printing system according to claim 4, wherein the first controller is configured to determine the destination based on a folder of the removable media in which the data is stored, the first controller determining that the destination is the server-side storage when the data is stored in a first predetermined folder, and the first controller determining that the destination is the internal storage when the data is stored in a second predetermined folder.

22. A printing device employed in a printing system comprising the printing device and a server, the server comprising a server-side communication interface configured to communicate with the printing device, a server-side storage configured to store data transmitted from the printing device, and a controller configured to store the data received by the server-side communication interface in the server-side storage, wherein
the printing device comprises:
a printing unit configured to print an image on a printing sheet;
an attachment unit to which a removable medium is removably attached;
a device-side communication interface configured to communicate with the server; and
a controller configured to:
acquire at least part of data in the removable medium attached to the attachment unit;
control the device-side communication interface to transmit the acquired data to the server; and
delete the data in the removable medium corresponding to the acquired data,
wherein the controller deletes the data in the removable medium corresponding to the acquired data after the device-side communication device transmits the acquired data to the server, and
wherein the printing unit executes printing using the acquired data transmitted to the server after the data in the removable medium corresponding to the acquired data has been deleted from the removable medium.

23. A non-transitory computer readable medium storing computer readable instructions to cause a printing device, which comprises a communication interface configured to communicate with a server, to perform a data protection process by executing steps of:
acquiring at least part of data stored in a removable medium removably attached to an attachment unit of the printing device;
transmitting the acquired data to the server through the communication interface;
deleting the data in the removable medium corresponding to the acquired data after transmitting the acquired data to the server through the communication interface and after the server stores the acquired data in the server-side storage; and
printing using the acquired data stored in the server-side storage after the data in the removable medium corresponding to the acquired data has been deleted from the removable medium.

24. A printing system comprising a printing device and a server configured to perform data communication with the printing device, wherein
the printing device comprises:
an attachment to which a removable medium is removably attached;
a data transmitting unit configured to transmit at least part of data in the removable medium attached to the attachment unit to the server;
a data deleting unit configured to delete the at least part of data, which is transmitted to the server, from the removable medium, and the server comprises:
a server-side storage configured to store the at least part of data transmitted from the printing device,
wherein the data deleting unit deletes the at least part of data, which is transmitted to the server, from the removable medium, after the server-side storage stores the at least part of data transmitted from the printing device; and
wherein the printing device executes printing using the transmitted at least part of data stored in the server-side storage after the at least part of data in the removable medium corresponding to the transmitted at least part of data has been deleted from the removable medium.

25. A printing system comprising a printing device and a server configured to perform data communication with the printing device, wherein
the printing device comprises:
an attachment to which a removable medium is removably attached; and
a controller configured to:
transmit at least part of data stored in the removable medium attached to the attachment unit to the server; and
delete the at least part of data, which is transmitted to the server, from the removable medium, and
the server comprises:
a server-side storage configured to store the at least part of data transmitted from the printing device'
wherein the controller deletes the at least part of data, which is transmitted to the server from the removable medium, after the server-side storage stores the at least part of data transmitted from the printing device, and
wherein the printing device executes printing using the transmitted at least part of data stored in the server-side storage after the at least part of data in the removable medium corresponding to the transmitted at least part of data has been deleted from the removable medium.

* * * * *